Nov. 24, 1964

H. R. CHOPE 3,158,028

PHYSICAL CONDITION MEASURING SYSTEMS

Filed Sept. 19, 1960

INVENTOR
Henry R. Chope
By Anthony D. Cennamo

Nov. 24, 1964  H. R. CHOPE  3,158,028
PHYSICAL CONDITION MEASURING SYSTEMS
Filed Sept. 19, 1960  5 Sheets-Sheet 4

INVENTOR
Henry R. Chope
Anthony D. Cennamo
By

Nov. 24, 1964   H. R. CHOPE   3,158,028
PHYSICAL CONDITION MEASURING SYSTEMS
Filed Sept. 19, 1960   5 Sheets-Sheet 5

INVENTOR
Henry R. Chope

United States Patent Office 3,158,028
Patented Nov. 24, 1964

3,158,028
PHYSICAL CONDITION MEASURING SYSTEMS
Henry R. Chope, Columbus, Ohio, assignor to Industrial
Nucleonics Corporation, a corporation of Ohio
Filed Sept. 19, 1960, Ser. No. 56,849
10 Claims. (Cl. 73—398)

This invention relates generally to a new class of measuring transducers for sensing and measuring a variety of physical variables including mechanical displacements, velocities, accelerations, temperatures, pressures, and thickness of objects, and more specifically it relates to measuring transducers in which a physical variable is coupled through a radiation field to an element whose output is an electrical current or voltage signal.

As used herein the term "transducer" denotes a device for measuring a physical variable by translating that variable to a signal of proper form and magnitude for further display or processing. For example, an extremely simple transducer is a thermocouple which translates a temperature to be measured to a corresponding electrical voltage. Further, as used herein, the word "transducer" is essentially equivalent to the words "measuring device," "measuring gauge," and "gauge." The terms "measuring system" or "transducer system" are used at various times and usually include in addition to a transducer varying degrees of associated data processing and display equipment.

The term "radiation sources" or "source of radiation" is interpreted herein to mean a radioactive isotope which emits radiation caused by the decay of the isotope. The "radiation" may consist of subatomic particles, such as alpha and beta particles, or may consist of true electromagnetic radiation, such as gamma radiation or radioisotope produced X radiation.

A large class of measuring instruments couple a physical variable to a pointer reading through various combinations of mechanical gears, cams, or levers. Such mechanical instruments possess the advantage of simplicity. Nevertheless they have the difficulty of requiring frequent adjustment and resetting to maintain process mechanical alignment. Other measuring instruments translate a physical variable, such as temperature, pressure, or displacement, to an electrical signal by varying or modifying a magnetic field. Such instruments have the disadvantage that they are often heavy and bulky, because of the high weight of magnetic core material and the associated copper wire used for various turns about the core. A survey of conventional measuring instruments or transducers can be found in the article "Chemical Engineering's Guide To Process Instrument Elements," by T. R. Olive and S. Danatos, Chemical Engineering, June 1957.

It is the general object of the present invention to provide a class of radiation transducers to accurately and reliably measure physical properties, including but not limited to mechanical displacements, velocity, acceleration, temperature, pressure, and mechanical thickness.

A more specific object of the present invention is to provide transducers which perform a measurement by translating a physical variable to an electrical signal by means of modifying a radiation field.

Another object of this invention is to provide a new class of measuring transducers whose output is a signal of analog characteristics.

Still another object of the present invention is to provide a new class of measuring transducers whose output is a train of pulses of digital character suitable for direct digital data processing and digital computation.

A further object of this invention is to provide new measuring transducers which are lightweight, compact, relatively simple, and which maintain their calibration.

Other objects and advantages of the invention will become apparent when the following detailed description is read in connection with the appended drawings in which.

Figure 1:
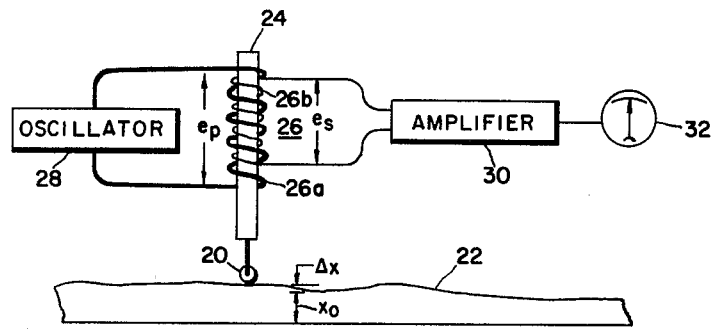
FIGURE 1 illustrates a conventional magnetic gauge whose output is an analog electrical signal used for measurement of sheet thickness or displacements along the surface.

Referring now to FIGURE 1, there is shown a conventional displacement transducer based on modifications of a magnetic field in accordance with changes in displacement. In this illustration a small wheel 20 contacts and rolls along the surface of a sheet 22. The rolling wheel 20 is attached to a movable magnetic core 24 coupling the primary 26a and the secondary 26b windings of a transformer 26. An oscillator 28 supplies a voltage $e_p$ to the primary 26a of the transformer. The voltage $e_s$ appearing across the transformer secondary then varies in accordance with the upward and downward movements of the rotating, contacting wheel 20. The voltage $e_s$ is amplified by amplifier 30 and indicated on a thickness meter 32. Therefore changes in thickness or displacement are indicated by the reading of the thickness meter.

Figure 2:
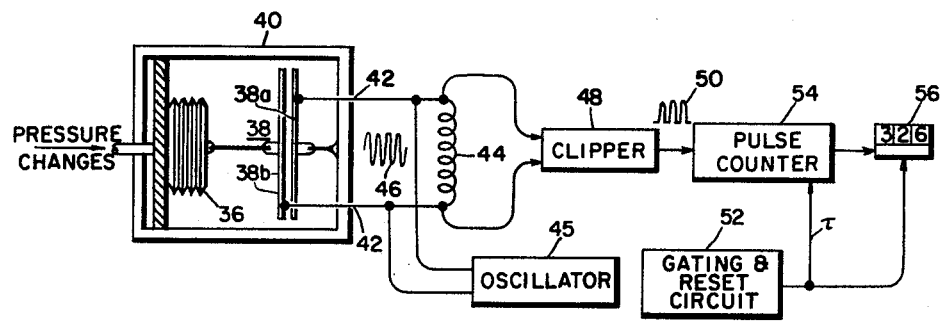
FIGURE 2 illustrates a measuring transducer in which a pressure is measured by changing the electric field between two capacitor plates so as to vary the frequency of an oscillator and in which the output is a digital signal.

FIGURE 2 illustrates a pressure measuring transducer based upon conventional techniques but which provides, however, a digital output. Most conventional transducers yield an analog output. By analog output is meant an electrical signal, such as a voltage or current, or a mechanical signal, such as a shaft or lever position, which varies continuously in accordance with the variation in some other physical quantity. By digital signal output is meant a succession of discrete pulses which can be counted or otherwise tabulated so as to yield discrete numbers or numerical values related to a quantity being measured.

In FIGURE 2 expandable bellows 36 are mounted in line with a capacitor 38. The capacitor comprises one fixed plate 38a and one variable plate 38b. The movable plate 38b is mechanically coupled to one end of bellows 36. Further, inert gases at a fixed pressure often are sealed within an outer chamber 40 so as to maintain essentially a constant pressure on one surface of the bellows. As the pressure changes, the bellows expand and vary the spacing between the two capacitor plates. Connections are made to two feed-through terminals 42. These feed-through terminals are connected to opposite ends of an electrical inductance 44. The capacitance 38 and inductance 44 then form a tank circuit of an oscillator 45. As the capacitor's spacing changes in accordance with pressure changes, the frequency of the tank circuit consisting of the capacitor and inductor is varied. Individual oscillator voltage cycles 46 are shown in somewhat enlarged fashion at a point beyond the tank circuit. The symmetrical oscillating cycles from the tank circuit are passed through an electrical clipper 48. The clipper 48 consists of biased diodes (not shown) which remove the negative half of each cycle. At the output of the clipper 48 there is obtained a sequence or train of unidirectional pulses 50 whose number and count per defined or constant period is related to the original pressure changes. A gating and reset circuit 52 activates a counter 54 for pulses 50 and allows the counter to count for a period of time designated herein by $\tau$ seconds. The number of pulses counted per period $\tau$ is then registered on a mechanical digital counter 56. At the end of each period $\tau$ the pulse counter is reset to zero condition so as to be ready for the next counting period, while simultaneously the mechanical digital counter is reset to indicate zero. Therefore, the reading of the mechanical counter at discrete times corresponding to the end of each period $\tau$ is an indication of input pressure changes to the transducer.

Figure 3:
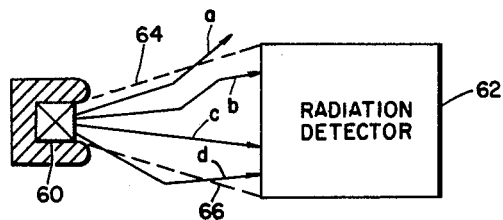
FIGURE 3 illustrates the definition of a radiation cone or radiation beam.

FIGURE 3 illustrates a radiation beam or radiation pattern existing between a radiation source 60 and a radiation detector 62. Various radiation sources may be utilized in the present invention. Such radiation sources may emit alpha or beta radiations which are, in fact, particles of subatomic character, or they may emit gamma radiation, which is a penetrating form of electromagnetic radiation. A useful form of radiation in applications of the present invention is beta radiation. Beta radiation consists of a flow of high-speed electrons emanating from a radioactive isotope. Beta particles, or high-speed electrons, are useful because they possess medium penetrating power, they may be absorbed by reasonably small dimensions, and the cone of beta radiation may be modified by various moving mechanical objects which cause varying degrees of scatter of the beta particles.

In FIGURE 3 dotted lines 64 and 66 show the outer extent of the radiation cone. A radiation cone exists only in a statistical sense; that is, within the radiation cone between a source and detector there is a maximum distribution of radiation intensity. The high-speed beta particles, in travelling from the source 60 to the detector 62, are not characterized by a straight line path. The path of a particular beta particle is likely to be "zigzag" or tortuous, resulting from multiple scattering with atoms or other particles in the media between the source and the detector. One may visualize the statistical or average nature of the radiation pattern by considering four individual beta particles. These individual beta particles are designated as particles $a$, $b$, $c$, and $d$ in the figure. Particle $a$ is scattered out of the beam and is not detected. Particle $b$ experiences multiple collisions along its path but is detected. Further, particle $b$ follows a longer path to the detector than the simple shortest line distane from the source to the detector. Particle $c$ traverses the distance between source and detector without significant scatter and is detected. Particle $d$ traverses initially outside the defined beam but is scattered and is detected.

When finite limits on the radiation beam or pattern are illustrated hereinafter, it will be understood that these limits exist only in a statistical or average sense, as described here.

Figure 4:
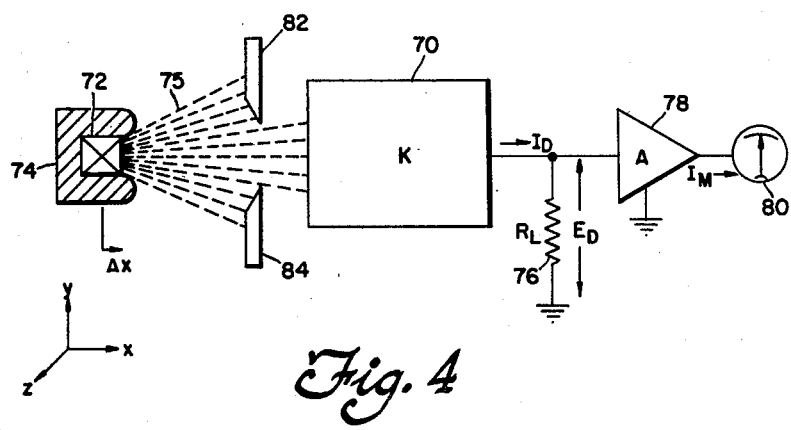
FIGURE 4 illustrates the various factors which determine the detected radiation received from a radiation source.

FIGURE 4 illustrates the various factors or elements relative to a radiation source and detector which determine the radiation detected and the corresponding current obtained from a radiation detector 70. A radiation source 72 is illustrated here as an encapsulated and sealed radioactive isotope with shielding 74 on various sides so as to permit a beam 75 to emanate from only one side of the source, the shaped characteristics of said beam being further determined by the collimating aperture of the source capsule. Such combination of source and shielding is shown for illustration purposes only. The actual source and shielding may be based on some of the newer radiochemical encapsulation techniques in which the radiochemical is thoroughly bound in a hard material and deposited onto a small surface area which surface is made to vary in accordance with some physical variable to be measured. Detector 70 receives the radiation after it is modified by a physical variable. Detector 70 translates the radiation intensity as determined by the rate of arival of individual radiation particles or events to a corresponding electric current $I_D$. Electric current $I_D$ is allowed to flow through a load resistor 76 to develop an input voltage $E_D$. This voltage $E_D$ is amplified by an amplifier 78 and the corresponding output current $I_M$ is measured on meter 80.

Returning now to the radiation beam, various baffles, rings, or other variable mechanical shapes may project into the beam of radiation. Two such mechanical shapes are designated as radiation baffles 82 and 84. Radiation dimensions for the following equation are indicated in terms of an $x$, $y$, and $z$ coordinate system shown below the block diagram.

The following formula is a reasonably close approximation to the current output, $I_D$, of the radiation detector $$I_D = KG(x, y, z) \frac{\epsilon^{-\rho\mu_m x}}{x^2}$$

The symbols appearing in this formula are explained hereinbelow.

According to the formula the absorption of the radiation in the medium between the source and detector is an exponential function. Absorption relationships for beta rays display a characteristic exponential shape. The exponential absorption of beta rays and gamma rays are described in the publication The Atomic Nucleus, by Evans, McGraw-Hill, 1956. The exponential absorption of beta radiation is described on p. 536 and the exponential absorption of gamma or X-type radiation is described in this cited work on p. 711. The exact atomic mechanisms causing the two types of radiation to be absorbed in essentially an exponential manner are considerably different for each type of radiation. In the above formula, the symbols have the following meaning: K is a constant for long-lived radio-isotopes whose value depends upon the source strength and the sensitivity of the detector in converting radiation into a current signal. It should be understood, of course, that small drifts may occur in detector sensitivity and in the radiation received from the source due to a slow decay of the radioisotope. The factor $G(x, y, z)$ is known as a geometry factor. This factor is a function of the spatial coordinates $x$, $y$, $z$ and depends upon all of the physical structures, objects, and relative dimensions existing between the source and detector. The symbol "$x$" is the distance of the source from the detector. The value of $x$ is the same in the denominator of the expression and in the exponent found in the numerator if there are no additional absorbers which intersect the entire radiation beam between the source and detector. $\rho$ is the density of the medium between the source and the detector. $\mu_m$ is the mass absorption coefficient which is characteristic of the absorbing medium and the radiation source. Mass absorption coefficients are usually determined experimentally and represent the percentage absorption of radiation per unit mass of the absorbing medium. $e$ is the natural base of logarithms. It can be seen that for a constant value of absorption coefficient $\mu_m$ three quantities can affect the detector output current. These are: the dimension $x$, the geometry factor $G(x, y, z)$, and the density of the medium $\rho$. In radiation density gauges the dimension $x$ and the geometry factor are maintained constant and the output meter reading is calibrated in terms of density variations. In the present invention the density of the medium between the source and detector is maintained essentially constant and the geometry factor or dimension $x$ or both are varied in accordance with changes in the value of a physical variable. Small changes in the dimension $x$ or in the geometry factor can result in large variations in output current. From the figure it can be seen that there are three basic ways in which a physical variable can change the radiation input to the detector.

The three ways in which the radiation field or pattern can be modified are: (1) the distance of the source can be varied, (2) the angle the source makes with respect to a constant line from the detector may be varied, or (3) the geometry factor may be varied by changing the radiation baffles. For measurement of a given physical variable translatable into a mechanical movement one or more ways of modifying the radiation field may be employed. Specific applications of the above techniques will be illustrated in the following figures.

Figure 5:
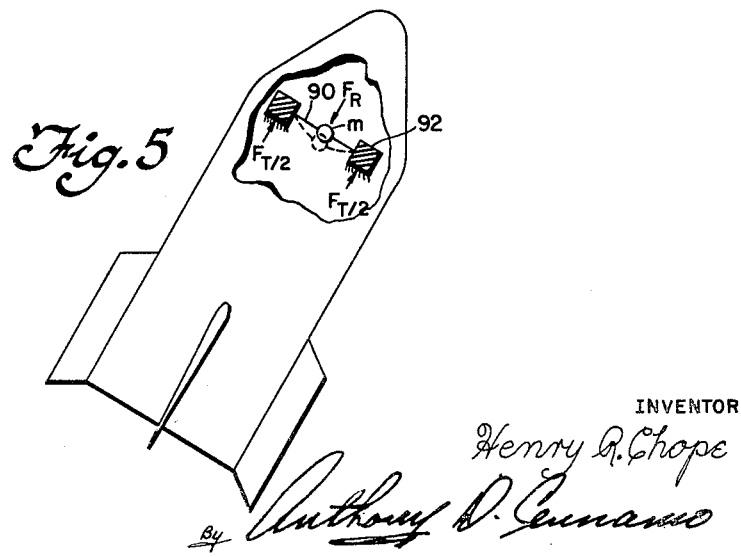
FIGURE 5 is a semipictorial drawing illustrating the mounting of an accelerometer in a missile in order to measure acceleration in terms of the displacement of a known mass.

FIGURE 5 shows in semipictorial form a mechanical device used to measure accelerations. Such devices are utilized in missiles and other vehicles that experience rapid changes in velocities. Shown in this illustration is a control mass $m$ supported by a stiff, circular diaphragm 90 clamped by ring supports 92 shown in the figure in cross-section. An accelerating force $F_T$ or thrust causes the missile or vehicle to accelerate. The reaction force $F_R$ can be equated to the product of the mass and the acceleration experienced by the mass $m$ if the supporting membrane is fairly stiff and if a damping means (not shown) is used to damp out transient oscillations as the mass $m$ moves in one direction or another in accordance with acceleration. The displacement experienced by the mass is approximately equal to $$x = \frac{F_T}{k}$$

In this expression, $x$ is the displacement experienced by mass $m$ under influence of accelerating force $F_T$ if the stiffness or resisting force of the diaphragm 90 is $k$. The stiffness coefficient $k$ is expresesd in units of force per unit distance, for example, kilograms per millimeter. Strictly speaking, $k$ is not a constant and depends upon the dimensions of the supporting diaphragm, how the diaphragm is supported at its extremes, and the stiffness characteristic of the material from which the diaphragm is made. However, deviations from the constant value of $k$ cause nonlinear indications in the output of the sensing device. Such nonlinearities can in practical measurements be otherwise compensated.

Figure 6:
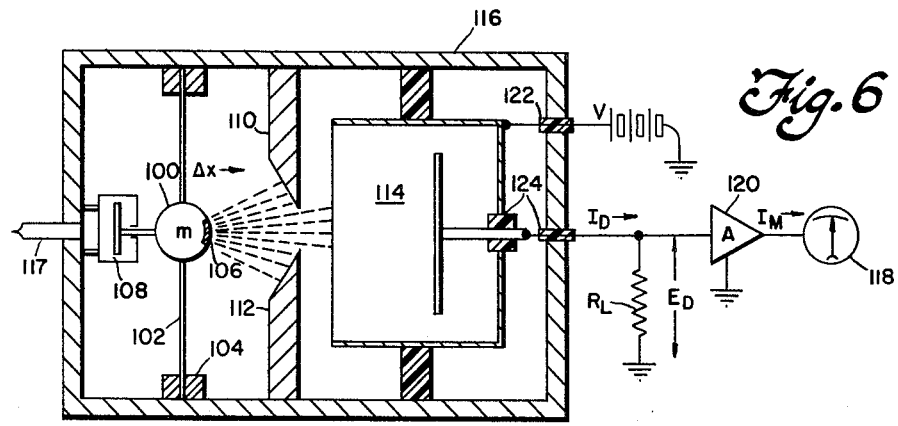
FIGURE 6 is a schematic view illustrating a radiation transducer used to measure acceleration.

FIGURE 6 illustrates an accelerometer used to detect acceleration according to the principles described in FIGURE 5. In this figure a mass 100 of value $m$ is supported by a stiff, flexible diaphragm 102 between diaphragm supports 104. A radioactive material 106 is deposited on one side of the mass 100 in such a manner as to yield a radiation field of controlled dimensions. A viscous damper 108 is likewise attached to the mass 100 in order to rapidly damp out transients caused when accelerating forces are varied. The described supported mass, radiation baffles 110 and 112, and a radiation detector 114 are sealed in a gas-tight outer chamber 116. Usually an inert gas, such as argon or krypton, forms the internal medium at a preselected constant pressure within the chamber 116. Gas-sealing tube 117 is crimped and tightly sealed in order to prevent leakage of the internal inert gas. Leakage of the gas would change both the pressure and density of the medium within the sealed chamber. The acceleration transducer works in the following manner.

Assume that there is an acceleration designated in FIGURE 6 by directional arrows indicated below the figure as $F_T$ and $a_R$. As the transducer is subjected to an applied force or thrust the mass 100 will move in the designated direction $x$ and assume a new position which is displaced from the rest position by an amount $\Delta x$. If the damping from the viscous damper 108 is sufficient, the mass 100 will assume its new position with only a small amount of oscillation. As the mass 100 with a deposited radiochemical 106 on its surface opposite to the radiation detector is moved nearer the detector, the detector current $I_D$ will increase.

Referring back to the earlier formula relating detector current to the radiation field, one can see that the variable $x$ in that formula is being varied. Also, because of the radiation baffles 110 and 112, the geometry factor $G(x, y, z)$ is varied a slight amount. The dimension, shape, and material of the radiation baffle is so selected as to linearize the output-indicated acceleration with respect to changes in applied acceleration. The output acceleration is indicated on a meter 118. By linearization is meant that the transducer is so designed that equal incremental changes in the input acceleration will give rise to equal incremental deflections of the indicating meter 118. The radiation detector current $I_D$ is allowed to flow through resistor $R_L$ so as to yield a corresponding voltage $E_D$. Voltage is amplified by an amplifier A, whose output current is indicated on meter 118.

It should be mentioned at this point that one form of radiation detector and amplifier input circuit essentially integrates the individual radiation particles or events, so as to yield an analog or continuous voltage to the amplifier A. A further embodiment of the invention involves pulse sensitive detectors utilized in conjunction with high-speed electronic elements to count and indicate the number of individual radiation events occurring per defined time. Detector polarizing voltage V is supplied through an insulating seal 122. It is important that seal 122 as well as probe seals 124 be of a high quality insulating material and be totally gas-tight.

Such an accelerometer has many advantages for use in missiles and aircraft, because of its light weight and overall size as compared to magnetic devices which incorporate heavy metallic transformer cores and extensive electrical wires.

Figure 7:
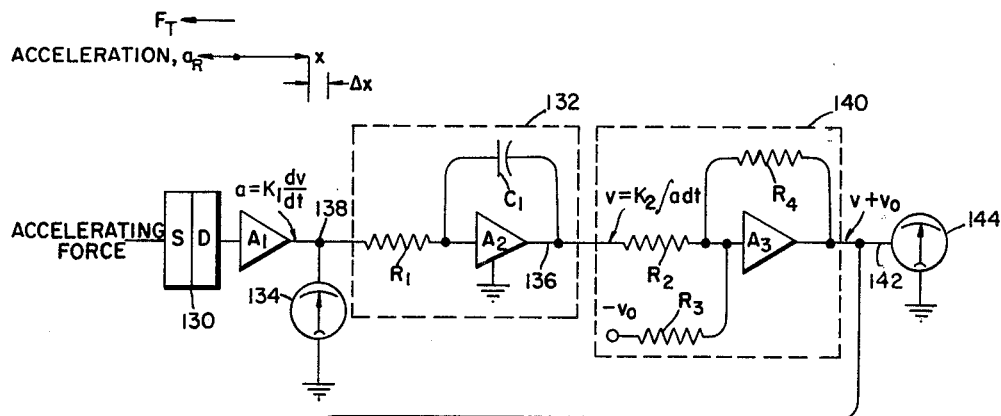
FIGURE 7 is a schematic diagram illustrating associated circuits used with the radiation accelerometer to measure velocity and cumulative displacements of a moving body.

FIGURE 7 shows the associated circuits that are used with the previously described radiation accelerometer to measure the velocity and cumulative displacements of a moving body. Acceleration is defined as the time rate of change of velocity, and velocity, in turn, is defined as the time rate of change of the displacement of an object. If an accurate measurement of acceleration can be obtained, then velocity may be continuously and automatically measured by properly integrating the acceleration on a time basis. It is understood, of course, that initial conditions may have to be added to the integrated value of acceleation to account for initial velocities. Likewise, accumulative displacement or movement of an object can be obtained by time integration of an accurately determined velocity. Once again, initial position or displacement information may have to be added to the time integral of the velocity in order to account for initial conditions of displacement.

The schematic circuit shown in FIGURE 7 operates in conjunction with the radiation accelerometer 130 which was described in connection with FIG. 6. The radiation accelerometer is shown by block 130 which symbolically indicates translation of an accelerating force to a corresponding voltage. In describing the associated circuits in this schematic the symbols $a$, $v$, and $x$, respectively, will be used to denote the corresponding voltage values at each point in the circuit for acceleration, velocity, and displacement. It will be understood, of course, that at a given point in the circuit a value indicated by $v$, for example, actually designates the voltage existing at that point which is proportional to the velocity, $v$. A buffer amplifier $A_1$ amplifies an electrical signal from the radiation accelerometer 130 and provides an output signal for both an integrator 132 and for an acceleration meter 134. Integrator 132 is an electronic integrator utilizing high-gain amplifiers well known in the analog computing art. Integrator 132 comprises an input resistor $R_1$ and an integrating capacitor $C_1$ connected between the output and input of an amplifier $A_2$. The voltage at the output 136 of integrator 132 is therefore proportional to the integrated signal applied at the input line 138. Following integrator 132 in the circuit is a combination adder-amplifier 140. The adder permits the introduction of initial velocities which might have existed prior to the start of an acceleration indicating period. This initial velocity is added to the amplifier output on line 136 of integrator 132 and yields a value at the output side 142 of the adder and amplifier equal to the total velocity. The amplification applied between the output of integrator 132 and the output 142 of the adder-amplifier is just sufficient to balance out the change in amplitude caused by the RC integration in integrator 132. The amplification of amplifier $A_3$ is determined by the ratio of $R_4$ to $R_2$. The ratio of $R_4$ to $R_3$ applied as a multiplier to the initial velocity is usually set to a value of 1 in practice. The electrical signal proportional to the total velocity at the output 142 of the adder-amplifier is applied to a velocity meter 144. The total velocity is, in turn, applied to the input of an integrator 146. The integrator 146 comprises an input resistor $R_5$ and integrating capacitor $C_2$ across high-gain amplifier $A_4$. The action and operation of integrator 146 is similar to that of integrator 132. An adder-amplifier 148 both amplifies the output 150 of integrator 146 and adds an initial displacement term $x_0$ to yield at the output 152 of adder-integrator the total displacement. The total displacement is indicated on a displacement meter 154 or presented to other suitable data transmission or processing devices. For high accuracy in the associated circuits herein described, voltage gains of amplifiers $A_2$, $A_3$, $A_4$, and $A_5$ must be extremely high, of the order of one hundred thousand to one million, and the D.C. component drift of these amplifiers must be extremely low. Low drift in such amplifiers is often obtained by chopper stabilization of each amplifier stage. Such methods of chopper stabilization are known in the art and are described, among other places, in Electronic Analog Computers, by G. Korn and T. Korn, McGraw-Hill, 1956, on pp. 234–239.

Figure 8:
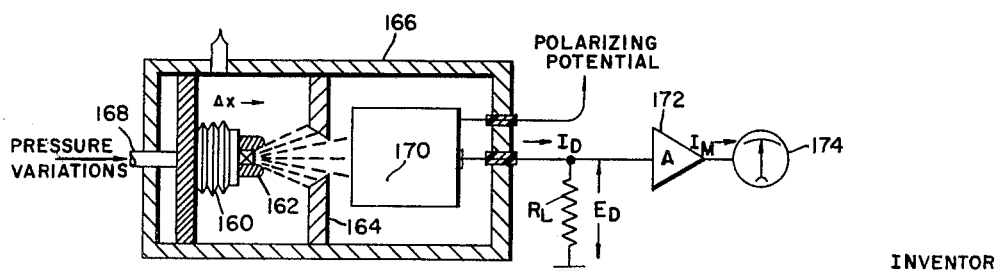
FIGURE 8 illustrates a radiation transducer used to measure pressure.

Referring now to FIGURE 8, shown is another embodiment of the invention used to measure pressure variations over wide ranges of pressure. In FIGURE 8 an expandable, leak-proof bellows 160, a shielded radioactive source 162 attached as shown to the bellows, and radiation baffles 164 are mounted within a gas-tight outer chamber 166. Pressure variations are introduced into the inner volume of the expandable bellows through tube 168. An inert gas, such as nitrogen, argon, or krypton, is introduced and sealed into the outer chamber 166. If the volume of the outer chamber is sufficiently larger than the internal volume of the expandable bellows, the inert gas within the outer chamber is maintained at an essentially constant internal density of the medium. Pressure variations cause the bellows 160 to move back and forth. Variation in the movement is designated in the figure by the distance $\Delta x$. The attached source 162 thus varies its distance with respect to a radiation detector 170.

The radiation detector yields an output of current $I_D$ related to the distance of the source from the detector. Current $I_D$ is allowed to flow through resistor $R_L$ to yield voltage $E_D$. This voltage is amplified by an amplifier 172. The output current from amplifier 172 is presented on a pressure meter 174. The pressure meter may be calibrated directly in terms of pressure units. The function of the radiation baffles 164 used between the source 162 and detector 170 is to collimate and totally absorb radiation from the outer parts of the radiation beam in such a manner that the meter reading will be a linear function of input pressure changes. The gas pressure maintained inside the outer chamber 166 is selected to allow the bellows to operate over a given pressure range. It is possible to have a number of different pressure transducers of similar construction but working over a different pressure range by simply maintaining different pressures in different pressure transducers. It should be noted in this embodiment of the invention that the variations in the physical variable, pressure, modify or modulate the radiation field by changing the distance of the source from the detector.

Figure 9:
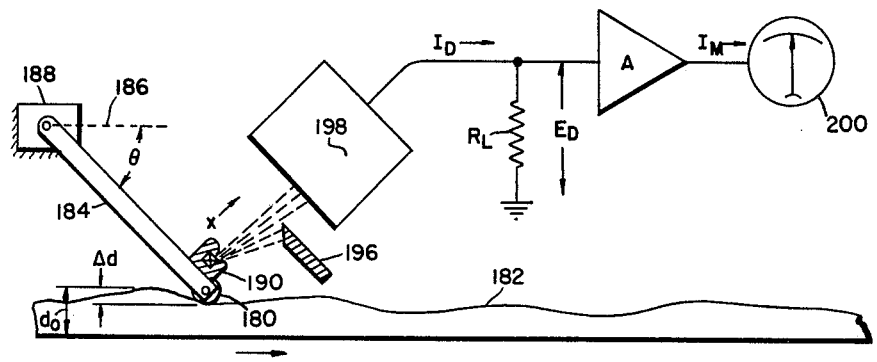
FIGURE 9 illustrates a radiation contacting thickness gauge for tracing surface variations along a sheet or other object.

FIGURE 9 illustrates another embodiment of the invention in which the radiation field is modified or modulated primarily by changing the relative angle of the source with respect to the position of the radiation detector. In this embodiment a small contacting wheel 180 moves along the surface of a sheet 182. A lever arm 184 moves up and down with respect to the surface variation. As the angle $\theta$ between the lever arm and the horizontal line 186 through lever support pin 188 varies, so also does the angle of a shielded source 190 vary with respect to the longitudinal axis of a radiation detector 198. The shielding of the source 190 is so selected that the radiation beam emanating from the source will be asymmetrical with respect to a longitudinal line through the center of the source capsule. As shown in FIGURE 9, radiation emanates in a pattern existing below the center line through the source, but does not exist above this line. As the source 190 changes its angular position, more or less of the radiation is intercepted by a lower radiation baffle 196. Radiation detector 198, load resistor $R_L$, amplifier A, and thickness meter 200 perform the same measuring functions in this illustration as in other embodiments of the invention.

Figure 10:
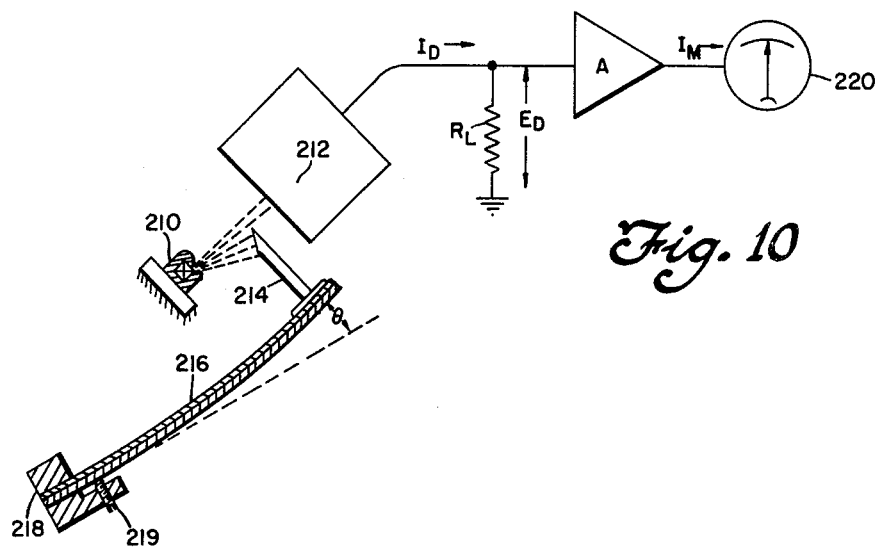
FIGURE 10 is a schematic diagram illustrating apparatus for measurement of temperature changes utilizing a radiation source and detector fixed in physical relationship to one another.

FIGURE 10 illustrates a radiation temperature transducer in which the radiation field between a radiation source 210 fixed in spatial relationship to a detector 212 is modified by a moving baffle 214 which intercepts varying proportions of the radiation beam in accordance with movements in a temperature-responsive bimetallic element 216. This bimetallic element is attached securely to a fixed base 218. As the temperature changes, the bimetallic element 216 will curve upward or downward. The upward or downward movement varies the degree to which the radiation baffle 214 is thrust into the radiation field. As in the previous illustration, the source is so shielded as to possess a radiation pattern of asymmetrical characteristics. It should be understood in this illustration and others in which radiation baffles, either fixed or movable, are utilized, that the material selected for the baffle fully absorbs all radiation. For example, if the radiation consists of beta particles from a beta emitting radioisotope these particles would be absorbed by approximately $30/1000$ inch of steel or $1/10$ inch of aluminum. No attempt is made to use a wedge of varying thickness so that its movement into the field will cause the wedge to have varying properties of absorption. The very tip of the wedge may, however, transmit some radiation, but the purpose of the wedge in this invention is to absorb practically all primary radiation and must be of essentially infinite thickness for the particular radiation utilized. By the term "infinite thickness" is meant a thickness of material of a given mass which absorbs substantially all of the primary incident radiation striking the wedge. Radiation detector load resistor $R_L$, amplifier A, and temperature meter 220 perform the same function in this illustration as in previous ones.

Figure 11:
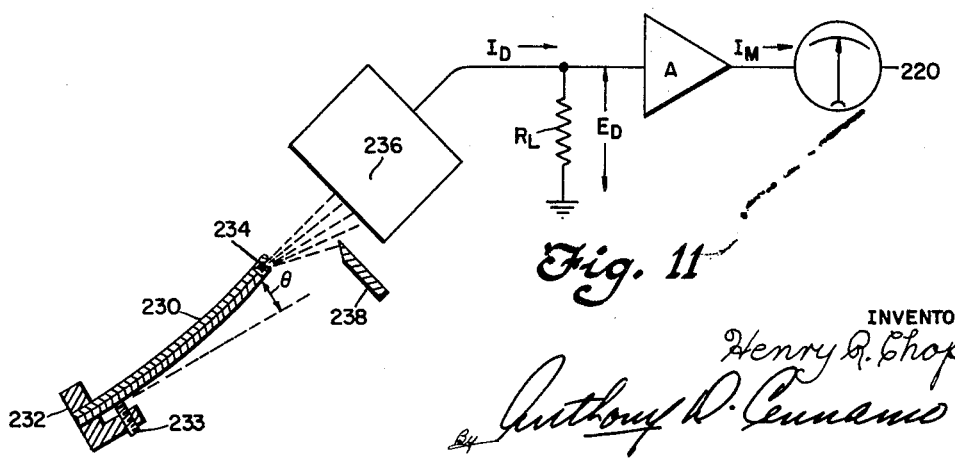
FIGURE 11 illustrates another form of radiation transducer to measure temperature.

FIGURE 11 illustrates another form of radiation transducer utilized to measure temperature. In this instance a bimetallic temperature-sensitive strip 230 is securely fixed to a base 232. As the temperature changes, the strip 230 will curl upward or downward, as shown in the figure. A shielded source 234 is attached to the end of the bimetallic strip 230, and as the temperature changes the angular position of the source 234 is varied with respect to the longitudinal axis of the radiation detector 236. The radiation baffle 238 is used to accent and augment the modification or modulation of the radiation field caused by angular changes in the position of the radioactive source 234. Radiation detector 236, load resistor $R_L$, amplifier A, and temperature meter 220 perform the same function in this example as in the previous examples.

Figure 12:
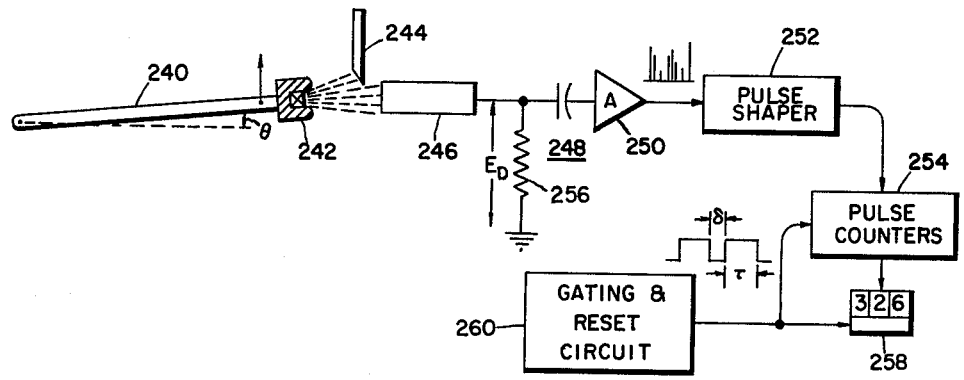
FIGURE 12 illustrates the associated pulse circuits used with a radiation transducer to yield a digital output.

FIGURE 12 illustrates schematically the associated circuitry utilized with a radiation transducer to produce a train of pulses suitable for digital data processing and numerical readout. In this example, the rate of arrival of individual radiation events or particles is modified according to a given physical variable, as illustrated in previous figures. As indicated in FIGURE 12, a variable causing a movement upward or downward of a lever arm 240 changes the angular position of a source 242 in accordance with changes in the variable. A radiation baffle 244 emphasizes the modification or modulation of the radiation field. It should be stated that for accurate reproduction and resolution of individual pulses obtained by the radiation detector 246 as the radiation field is modulated, all elements in the associated circuitry must possess high speeds of response or wide bandwidth characteristics. That is, the pulse detector 246, the coupling network 248 between the pulse detector and the amplifier 250, the amplifier, the pulse shaper 252, and the pulse counter 254 must all be high-speed response or wide bandwidth devices.

For a given value of a physical variable being measured, the average number of pulses received per unit of time is essentially constant. However, due to the statistical and random nature of the individual disintegration events received from a radioisotope source, spacing between consecutive pulses within a given pulse measuring period will vary according to a statistical distribution most closely described by a Poisson distribution. The various factors which determine the bandwidth of electronic elements used to transmit pulses are (1) average pulse rate, (2) minimum spacing in time between adjacent pulses that are to be resolved, (3) pulse widths, and (4) the shape of pulses, in particular the rate of rise and fall of the leading and trailing edges of the pulses. The bandwidth required to transmit equally spaced pulses of various shapes and widths is described in considerable detail in Frequency Analysis, Modulation and Noise, Stanford Goldman, McGraw-Hill, 1948, pp. 67 through 140. In particular, discussed on pp. 84 and 85 is the required bandwidth necessary to resolve equally spaced, consecutive pulses. It is usually considered that reciprocal relationships exist between pulse width and the bandwidth necessary to reproduce the pulse. This relationship is sometimes referred to as "reciprocal spreading." This relationship states that the frequency bandwidth necessary to reproduce a pulse is inversely proportional to the pulse width. For example, if pulses equally spaced in time are considered, pulses one microsecond wide would require associated equipment to have a bandwidth of approximately one megacycle per second for reasonably good resolution and transmission of the pulses. However, for pulses obtained from the random decay of a radioisotope, the spacing between consecutive pulses may be much less than the average spacing of a large number of such pulses. For example, if the average repetition rate of pulses received from a radioisotope is one million pulses per second, the bandwidth required to transmit the pulses would be of the order of 10 megacycles per second. Nevertheless, if sufficiently broad bandwidth electronic elements are used, the variation in average pulse repetition rate caused by a change in a measured physical variable can be used as a numerical indication of the variable's value. Since the average number of pulses per controlled period of time is an indication of the value of a physical variable, an accurate count of such pulses per successive counting periods can be considered to represent a digital value of the variable. Such modulation is known as pulse number modulation (PNM). Various types of pulse modulation are described on page 202 of the Goldman book.

In the associated circuit shown in FIGURE 12, the individual pulses are developed across a detector load 256. The voltage so developed is presented to the high-speed amplifier 250. The output from the high-speed pulse amplifier is then fed to a pulse shaper 252. The pulse shaper performs several functions. Pulses whose amplitudes are below some threshold value are clipped or otherwise removed by the pulse shaper. Differentiating networks are further used to sharpen the leading edge of each pulse. The resulting pulses are then of approximately equal amplitude. The pulses are then counted by an electronic counting circuit 254 and indicated by a numerical readout counter 258.

Shown in FIGURE 12 below the pulse counter and the numerical readout counter is a gating and reset circuit 260. This circuit initiates each pulse counting period. The pulse counting period is selected to be of some predetermined time and is illustrated here as existing for $\tau$ seconds. After each counting period a reset negative pulse causes the numerical counter and the electronic counter to be reset. Hence, successive time "bundles" of pulses are counted and tabulated. Such trains of pulses are useful in data processing devices or digital computers designed to receive information in terms of pulse trains or pulse sequences.

Figure 13:
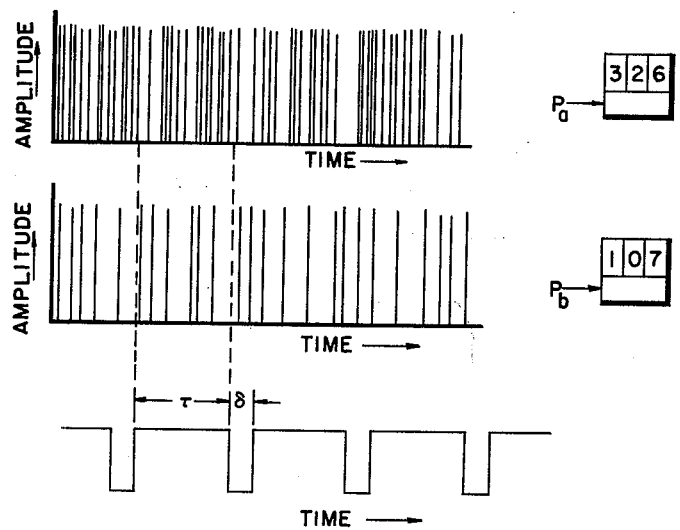
FIGURE 13 illustrates the pulse trains obtainable from a digital transducer and the corresponding numerical readout of these pulse trains.

FIGURE 13 shows on an expanded time basis the pulse trains existing for two values of a variable herein designated as $P_a$ and $P_b$. The pulse spacing is less for variable $P_a$ than for variable $P_b$. The count of the pulses existing during consecutive periods of $\tau$ seconds then yields the numerical value of the variables $P_a$ and $P_b$. Below the two pulse trains is shown the gating and reset waveform. No attempt is made to synchronize a particular data pulse with the starting or ending of the gating pulses. In connection with the gating pulses a differentiating circuit is used to start the pulse counter in its numerical readout. The same differentiating network yields a negative pulse at the end of each period $\tau$ used to reset the pulse counters. The corresponding numerical readout value for each set of pulse trains is shown in FIGURE 13 to the right of each pulse train. For example, if the value of a variable $P_a$ is 326, the radiation digital transducer would be so calibrated and adjusted to yield 326 pulses per pulse-counting period $\tau$. A useful adjustment for calibration purposes is the gating width; that is, the gating width is selected so that the average number of pulses per period $\tau$ would correspond to the value of the physical variable being measured. It should be stated that statistical fluctuations vary the exact number of pulses per period $\tau$. However, by selecting sufficiently high pulse count rates and by designing broad band electronic elements, the errors caused by the statistical fluctuations about the average count rate can be minimized.

What is claimed is:

1. Apparatus and circuits for converting the acceleration output from an acelerometer to a corresponding velocity and displacement of a moving object, said apparatus comprising a first integrator to yield velocity, a first adder-amplifier to add initial velocity at its input and yield an output of total velocity, a second integrator to yield displacement, and a second adder-amplifier to add initial displacement at its input and yield an output of total displacement.

2. A digital transducer for measuring pressure or other physical variable that can be coupled to a moving plate of a condenser, a condenser with one fixed plate and one variable plate whose position is changed in accordance with changes in a measured variable, an oscillator with tank circuit consisting of an inductor and the said condenser, an electronic clipper circuit to produce a train of unidirectional pulses related in number to the physical variable being measured, a pulse counting circuit, a digital readout device for registering the count of the pulses counted by said circuit, and a gating circuit to provide consecutive gating period pulses and to reset said counting circuit and readout device at the end of each gating period, said counting circuit being controlled by the said gating circuit to count and totalize pulses received from the said clipper during each consecutive gating period.

3. Radiation transducer apparatus for measuring physical variables, comprising:
   a radioactive source,
   a radiation detector,
   means for generating pulses in response to detected radiation from said source,
   means for modifying the radiation field between said source and detector in accordance with variations in a physical variable being measured, and
   digital recorder means which comprises a counter for said radiation responsive pulses, said counter being resettable to zero in response to a reset pulse, a gating circuit connected between said pulse generating means and said counter for enabling said radiation responsive pulses to actuate the same only in response to a gating pulse, and timing pulse generator means for providing said gating and reset pulses alternately.

4. An accelerometer for measuring acceleration of a mass, comprising:
   the apparatus of claim 3 and a damped mass as said radiation field modifying means.

5. An accelerometer as in claim 4 including
   a casing,
   means for flexibly mounting said damped mass in said casing toward one end thereof to allow damped movement of the mass to and fro from a given position substantially along the axis in which acceleration is to be measured,
   said radioactive source being located on the mass side which faces the casing end opposite said one casing end, and
   said detector being positioned in said opposite end to receive radiation from said source for providing to said pulse generating means a signal related to the amount of acceleration of said mass along said axis.

6. Apparatus as in claim 3 wherein said modifying means includes means for varying the distance between said source and detector.

7. Apparatus as in claim 3 wherein said radioactive source provides a radiation beam to be received by said detector, and wherein said modifying means includes means for varying the angular position of one of said source and detector relative to the other to cause the angle at which said beam is received by said detector to vary in accordance with the said variations in the physical variable being measured.

8. Apparatus as in claim 3 wherein said modifying means includes a radiation absorbing baffle and means for moving said baffle variably, in accordance with the said variations in the physical variable being measured, into said radiation field so as to intercept and totally absorb a corresponding portion of the radiation beam between said source and detector.

9. Apparatus as in claim 3 wherein said modifying means includes a bimetallic element sensitive to temperature variations.

10. Apparatus as in claim 3 wherein said modifying means includes a bellows sensitive to pressure variations.

References Cited in the file of this patent

UNITED STATES PATENTS

| 2,301,396 | Graff | Nov. 10, 1942 |
| 2,304,191 | Matt-Smith | Dec. 8, 1942 |
| 2,506,585 | Elliott | May 9, 1950 |
| 2,554,715 | Mellett | May 29, 1951 |
| 2,714,668 | Zinn | Aug. 2, 1955 |
| 2,767,973 | Veen | Oct. 23, 1956 |
| 2,800,591 | Gilman | July 23, 1957 |
| 2,826,699 | Hull | Mar. 11, 1958 |
| 2,882,417 | Johnson | Apr. 14, 1959 |
| 2,883,555 | London | Apr. 21, 1959 |
| 2,906,878 | Goodman | Sept. 29, 1959 |
| 2,908,819 | Marx | Oct. 13, 1959 |
| 2,957,081 | Chapman | Oct. 18, 1960 |
| 2,965,753 | Reynolds | Dec. 20, 1960 |
| 3,024,364 | Wanetick | Mar. 6, 1962 |
| 3,036,214 | Forney | May 22, 1962 |
| 3,062,443 | Palmer | Nov. 6, 1962 |

FOREIGN PATENTS

| 713,840 | Great Britain | Aug. 18, 1954 |
| 329,938 | Switzerland | June 30, 1958 |

OTHER REFERENCES

Flow Measurement by the Total Count Method, by Hull et al., Second International Conference on Peaceful Uses of Atomic Energy, United Nations Press, 1958, vol. 19, pages 324 to 332.